J. P. REINECKE.
WATER HEATER.
APPLICATION FILED SEPT. 2, 1911.
1,063,733.
Patented June 3, 1913.
3 SHEETS—SHEET 2.
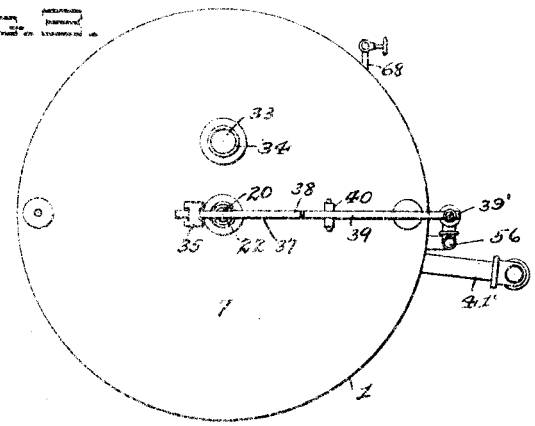
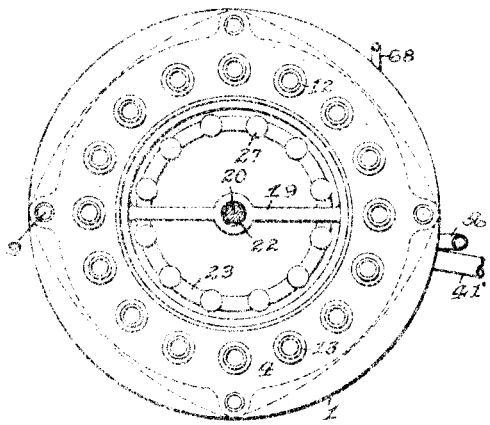 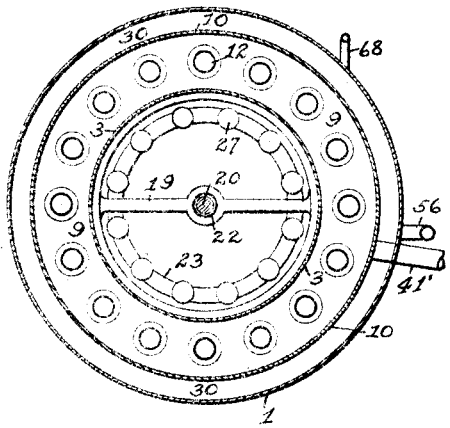
WITNESSES
INVENTOR
John P. Reinecke
By J. H. Cooke
Attorney J. P. REINECKE
WATER HEATER.
APPLICATION FILED SEPT. 2, 1911.
1,063,733.
Patented June 3, 1913.
3 SHEETS—SHEET 3.
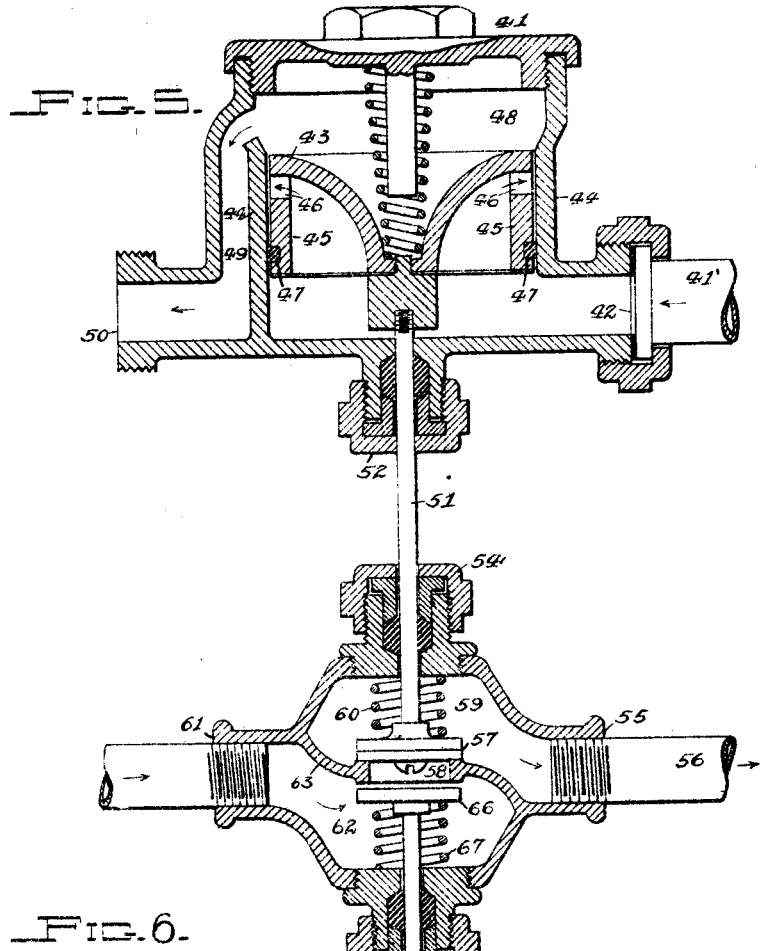
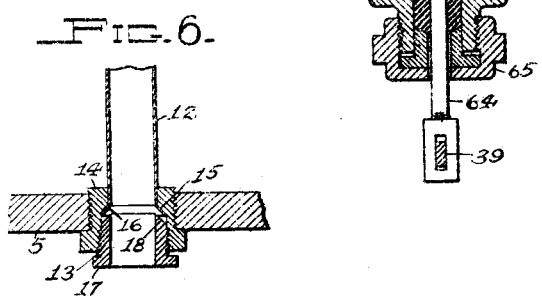
WITNESSES
INVENTOR
John P. Reinecke
By J. H. Cooke
Attorney

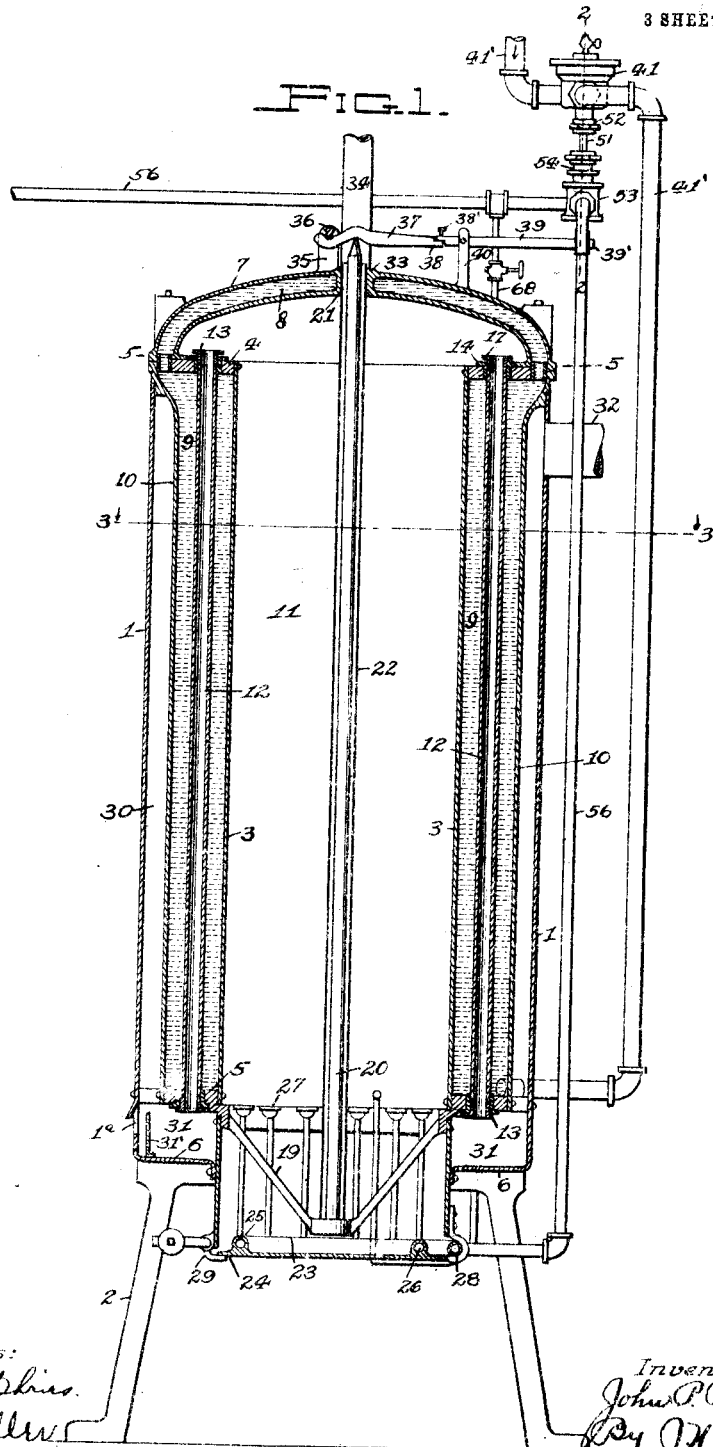

UNITED STATES PATENT OFFICE.

JOHN P. REINECKE, OF CRAFTON, PENNSYLVANIA.

WATER-HEATER.

1,063,753.  Specification of Letters Patent.  Patented June 3, 1913.

Application filed September 2, 1911. Serial No. 647,345.

*To all whom it may concern:*

Be it known that I, JOHN P. REINECKE, a citizen of the United States, and a resident of Crafton, in the county of Allegheny and State of Pennsylvania, have invented a new and useful Improvement in Water-Heaters; and I do hereby declare the following to be a full, clear, and exact description thereof.

My invention relates to instantaneous water heaters wherein the water and gas supply are controlled by the mechanism of the heater.

The object of my invention is to provide a cheap, simple and efficient form of instantaneous water heater whereby the supply of water will regulate the supply of gas admitted to the burner of the same, and such regulation is accomplished by governing means dependent on the temperature of the water in said heater.

To these ends my invention consists, generally stated, in the novel arrangement, construction and combination of parts as hereinafter more specifically set forth and described and particularly pointed out in the claims.

To enable others skilled in the art to which my invention appertains to construct and use my improved instantaneous water heater, I will explain the same more fully, referring to the accompanying drawing, in which:—

Figure 1 is a vertical cross-sectional view of my improved instantaneous water heater. Fig. 2 is a cross-sectional view of the heater on the line 3—3, Fig. 1, and looking in the direction of the arrows. Fig. 3 is a top plan view of the heater. Fig. 4 is a top plan view of the heater on the line 5—5, Fig. 1, with the cover removed. Fig. 5 is a vertical cross-sectional view of the water and gas supply valves on the line 2—2 of Fig. 1. Fig. 6 is a detail sectional view of the method of fastening the tubes in the water chamber of the heater.

Like symbols of reference herein indicate like parts in each of the figures of the drawing.

As illustrated in the drawing, my improved instantaneous water heater is made of the ordinary shape and in the ordinary sizes, and is composed of the usual metal casing 1, which is supported by means of legs or standards 2 at the bottom of the same, such legs being adapted to rest on the floor to hold the heater in a vertical position; and being secured to the casing 1 in any suitable manner. Within the casing 2 is an inner jacket 3 which is secured at the upper end of the same to a supporting plate 4, and at its lower end is secured to a like plate 5 and to the flanged portion 6 of the metal casing 1. At the upper end of the casing 1 is a cover 7, and said cover has a hollow interior 8 which is adapted to communicate with the fluid chamber 9, which is formed between the inner jacket 3 and an outer jacket 10, said last named jacket being secured at its upper end to the plate 4 and at its lower end to the plate 5.

Within the fluid chamber 9 which extends entirely around the combustion chamber 11 formed by the inner jacket 3, and spaced equally around the same is a series of flue tubes or pipes 12, and said tubes are adapted to extend between the plates 4 and 5 and are secured thereto by means of the tube fastening device 13. A bushing 14 is screwed into the plate 4 or 5, and such bushing is provided with a tapered shoulder 15 against which the flared end 16 of the tube 12 is adapted to rest. Another bushing 17 is then screwed into said first named bushing and bears against the flared end 16 of the pipe 12 by its tapered end 18 in order to insure a perfect joint and to prevent any movement or slipping of said tubes due to the expansion or contraction of the metal.

In the center of the combustion chamber 11 and supported therein by means of the bracket 19 is a rod 20, and such rod is made of a non-expanding metal and extends upward through an opening 21 in the cover 7, through which it is slidably mounted, while a cover 22 of insulating material is placed around said rod to protect it from the heat from said combustion chamber. The top of the rod 20 is tapered to a point for the purpose to be hereinafter described. A burner 23 is provided at the bottom of the combustion chamber 11, and such burner is circular in shape and formed integral with the bottom 24, and has openings 25 in the upper face of the same, and such openings are adapted to communicate with the hollow interior 26 of said burner. Into each of the openings 25 in the burner 23 a burner tip or nipple 27 is adapted to be placed, and the upper end of the same extends to a height coincident with the plate 5. The burner 23 and bottom 24 is adapted to be swung downward when desired, and this is accomplished by means of a swivel joint 28 at one side of the same, and the other side of said burner and bottom is secured in its upright position by means of a check or latch 29.

The outer jacket 10 is adapted to form a passageway 30 between the same and the casing 1, and said passageway extends entirely around within said casing and communicates with the tubes 12 by a passageway 31 below the same and formed by the flanged portion 6 of the metal casing 1 and the lower end of the inner jacket 3 so that the products of combustion may pass from the combustion chamber 11 and downward through the tubes 12, thence through the passageway 31 and upward through the passageway 30, at the upper end of which is a flue connection 32 for carrying away such waste products of combustion. Within the passageway 31 formed by the flanged portion 6 of the casing 1 and extending upward from said flanged portion is a deflector 31', which is adapted to shield a check 1ᵃ in said casing, as hereinafter described.

At the top of the cover 7 and at a point near the center of the same is an outlet opening 33 into which a pipe 34 is fitted for drawing fluid from the fluid chamber 9 and through the hollow interior 8 of said cover. The top of the cover 7 is also provided with a post 35, which is at a point substantially near the opening 21 in said cover, and said post has a fulcrum 36 thereon for the purpose of pivoting an arm 37 thereon, while said arm also extends over the pointed upper end of the rod 20 and beyond the same, and engages by its free end 38 with an arm 39 which is pivoted in a fulcrum 40 on the top of the cover 7. A set screw 38' is fixed in the end of the arm 39 and is adapted to bear by the screw end of the same with the free end 38 of the arm 37 for the purpose of regulating the distance between said arms, thereby regulating the temperature of the water. The arm 39 extends beyond the outer casing 1 of the heater and connects with a valve, as hereinafter described and forming the subject matter of a co-pending application filed June 6, 1912, Serial No. 701,981.

Above the casing 1 is a fluid valve casing 41 which is adapted to be connected to the water supply pipe 41' by its supply opening 42, and said casing has an inverted plunger 43 within the same, said plunger operating between the walls 44 of said casing, while the side walls 45 of said plunger are provided with ports 46 therein and have a packing ring 47 below such ports for preventing the binding of the metal of said walls 44 and the walls 45 of said plunger. The bottom of the plunger 43 is covered with a sheet of wire gauze 43' to prevent any dirt or foreign substance from passing through the valve casing 41 and into the heater. The casing 41 is also provided with an enlarged chamber 48 above the plunger 43, and connecting with said chamber is a passageway 49, which connects with the outlet port 50.

At the bottom of the plunger 43 and at the center of the same is a rod 51 which extends downward through the valve casing 41 and through the ordinary stuffing box 52, and enters a fuel valve casing 53 through another stuffing box 54 at the top of the same. The valve casing 53 is provided with an outlet port 55 through which the fuel is adapted to enter the heater by means of the supply pipe 56 secured therein, and a valve 57 is secured to the end of the rod 51 extending downward from the valve casing 41 and is adapted to open and close the port 58 within the inner wall 63 of the casing 53 by the operation of the fluid valve 41 above the same. The outlet port 55 communicates with a chamber 59 in which the valve 57 is adapted to operate, and a spiral spring 60 is placed around the rod 51 and its movement is limited by the upper part of the casing 53 and the valve 57. At the other side of the valve casing 53 is an inlet port 61, and such port communicates with a chamber 62 which is below and separated from the chamber 59 by the inner wall 63, while a rod 64 enters said chamber from below and through the valve casing 53 and a stuffing box 65, and is secured at its lower end to the arm 39, while the upper end of the same carries a valve 66 which is adapted to control the opening or port 58, as hereinafter explained. Around the rod 64 and within the valve casing 53 is a spiral spring 67 which is adapted to rest between the lower wall of said casing and the valve 57 to hold said valve in its raised position.

The fluid supply pipe 41' after connecting to the outlet port 50 of the valve casing 41 passes downward along the side of the casing 1 of the heater and connects with the fluid chamber 9 in order to supply the same with water or other fluid to be heated, while the fuel supply pipe 56 after leaving the valve casing 53 passes downward along the side of the casing 1 in a manner similar to the fluid supply pipe 41' and connects with the swivel joint 28 so that the fuel passing through the supply pipe 56 may enter the hollow interior 26 of the burner 23, and the fluid connection will thus remain intact when said burner is swung downward on said swivel joint. Connecting with the fuel supply pipe 56 and at a point previous to the position of the valve casing 53 is a pilot supply pipe 68 which communicates with said fuel supply pipe and is of a much smaller diameter than the same.

The operation of my improved instantaneous water heater is as follows:—When water is drawn from the heater through the pipe 34 the pressure of the water supply in the pipe 41' bears against the plunger 43 in the valve casing 41 and raises the same, so that the water passes through the ports 46 and into the chamber 48 and downward through the passageway 49 and the port 50 and through the pipe 41' to the fluid chamber 9 of the heater. As the plunger 43 in the valve casing 41 raises by the pressure of the water, the rod 51 connecting with the bottom of the same will be likewise raised, and the valve 57 secured to the lower end of said rod will thus be raised to open the port 58 below the same and thus allow for the passage of the fuel through such port, since the normal position of the valve 66 on the rod 64 is away from the port 58, as hereinafter explained. When the valve 57 is thus raised from the port 58 in the inner wall 63 of the valve casing 53, the fuel entering through the port 61 from the fuel supply pipe 56, passes into the chamber 62, and thence through the port 58 and into the chamber 59 and out through the port 55 and downward through the pipe 56 and enters the hollow interior 26 of the burner 23 through the swivel joint 28 connecting said pipe and burner. The fuel then passes upward through the openings 25 and the burner tips or nipples 27 and is ignited upon issuing from the top of the same by means of the pilot light which is kept burning constantly. The products of combustion of the fuel pass into the combustion chamber 11 and thence downward through the tubes 12 within the fluid chamber 9, and then through the passageway 31 and into the chamber 30, and is then exhausted into the chimney or flue through the flue connection 32 communicating with the top of said chamber. The products of combustion after passing downward through the tubes 12 and into the passageway 31 will strike against the deflecting plate 31' and thus pass into the chamber 30 without pouring through the check 1ª in the casing 1. The products of combustion when at the top of the combustion chamber are in a heated condition and when passing downward through the tubes 12 will become gradually cooled by its contact with the inside of such tubes, the outsides of which are surrounded with the water, and as the hot water rises on account of its being lighter than the cold water which is admitted at the bottom of the heater, the products of combustion will become cooler as they near the bottom of said tubes. This will aid the circulating of said products of combustion as the cooler gases will tend to raise the same upward in the chamber 30 and to the flue connection 32. The check 1ª in the casing 1 will prevent any back draft from entering the combustion chamber, as the same will exhaust through said check, while in the ordinary operation of the heater the air entering said check and passing into the heater will prevent excessive draft in raising of the products of combustion to the flue connection 32. As the water is drawn from the heater through the pipe 34 the fuel entering the combustion chamber 11 and being ignited by the pilot light therein heats the water which is in the fluid chamber 9, and such heated water being of a lesser specific gravity than the unheated water entering the said fluid chamber by means of the supply pipe 41', will rise and pass into the hollow interior 8 of the cover 7, and thus pass through the opening 33 and into the pipe 34 above the same. The heat from the combustion of the fuel in the combustion chamber and through the tubes 12 and chamber 30 will cause such parts to expand so that the heater body will be extended upward a slight amount when the parts become heated thereby. Since the rod 20 is of a non-expanding metal and is covered with the insulating cover 22 to protect it from the heat in said combustion chamber, such rod will not be affected by the heat from said chamber but will retain its ordinary length at all times. When the heater has become heated to a certain degree of temperature as fixed by experiment and as set by the adjusting screw 38' in the arm 39, the heater on expanding will raise the port 35 and will thus allow the free end 38 of the arm 37 to drop, whereupon the arm 39 will be released and the spring 67 will raise the rod 64 and valve 66, so that such valve will close the port 58, and thus shut off the flow of fuel through the valve casing 53 and the pipe 56 and into the burner 23. The casing 1 on expanding will slowly close the port 58, as described, so that when the fluid being drawn from the heater is gradually getting warmer the valve 66 will be slowly rising and reducing the flow of fuel through said port. In this manner the heater will have a perfect regulation so that as the fluid becomes warmer the supply of fuel for combustion becomes smaller, while as the water or other fluid becomes cooler the casing 1 will contract and thus open the port 58 by means of the fulcrum 36, which will tilt the arm 37, thereby raising the free end 38 thereof and drawing down the free end 39' of the arm 39, which will place tension on the spring 67 in the valve casing 53, and thus draw the rod 64 and valve 66 downward to open said port. The post 35 on the cover 7 acting as a fulcrum for the arm 37 and the fulcrum 40 carrying the arm 39, will act as a multiplier for the regulation at the free end 39' of the arm 39, in that when the heater contracts both the post 35 and fulcrum 40 will drop downward on account of both being fixed to the same cover 7, and as the rod 20 is of a non-expanding metal and retains its original height the free end 39' of the arm 39 will be lowered just about twice the distance it would if a single arm and fulcrum were used.

It will be readily seen that with my improved form of instantaneous water heater the arrangement of the parts and system of the same is such that both the cool water and cool gases are in the bottom of said heater while the heated products of combustion and heated water are at the top of the same. The advantage derived from this is that the natural tendency of both heated water and gases is to rise, and the operation of the heater will be more efficient thereby.

In the water and fuel valves of my improved heater, such valves being of the form shown will insure a perfect and even flow of both fuel and water, and will be absolutely safe and not likely to get out of order so readily as the separate valves depending for their operation on external mechanism. The method of holding the tubes 12 in the plates 4 and 5 will prevent the same from becoming loose by the contracting and expanding of the metal, and will insure a perfect joint at all times.

What I claim as my invention and desire to secure by Letters Patent is:—

1. A water heater comprising a thermostatic casing, an annular water chamber having a combustion chamber formed therein, a burner in said combustion chamber, means for causing the products of combustion to pass through said water chamber and thence in contact with said casing, and means for controlling the flow of fuel to said burner and under control of said casing.

2. A water heater comprising a thermostatic casing, an annular water chamber having a combustion chamber formed therein, a burner in said combustion chamber, tubes for causing the products of combustion to pass from said combustion chamber through said water chamber and thence in contact with said casing, and means for controlling the flow of fuel to said burner and under control of said casing.

3. A water heater comprising a thermostatic casing having a water chamber therein, a burner in said casing, a water valve connected to said chamber, a normally closed fuel valve operated by said water valve and adapted to supply fuel to said burner, means for causing the products of combustion to pass through said water chamber and thence in contact with said casing, and means connected to said fuel valve for regulating the admission of fuel to said burner to correspond to the variations of the temperature in said casing.

4. A water heater comprising a thermostatic casing having a water chamber therein, a burner in said casing, a water actuated valve connected to said chamber, a normally closed fuel valve operated by said water valve and adapted to supply fuel to said burner, means for causing the products of combustion to pass through said water chamber and thence in contact with said casing, means connected to said fuel valve and supported by said casing, and means engaging with said first named means for regulating the admission of fuel to said burner to correspond to the variations of the temperature in said casing.

5. A water heater comprising a thermostatic casing having a water chamber therein, a burner in said casing, a water actuated valve connected to said chamber, a normally closed fuel valve operated by said water valve and adapted to supply fuel to said burner, means for causing the products of combustion to pass through said water chamber and thence in contact with said casing, levers connected to said fuel valve and supported by said casing, and means engaging with said levers for regulating the admission of fuel to said burner to correspond to the variations of temperature in said casing.

6. A water heater comprising a thermostatic casing having a water chamber therein, a burner in said casing, a water actuated valve connected to said chamber, a normally closed fuel valve operated by said water valve and adapted to supply fuel to said burner, means for causing the products of combustion to pass through said water chamber and thence in contact with said casing, a lever connected to said fuel valve and supported by said casing, a lever adapted to engage with said first named lever and supported by said casing, and means engaging with said last named lever for regulating the admission of fuel to said burner to correspond to the variations of temperature in said casing.

7. A water heater comprising a thermostatic casing having a water chamber therein, a burner in said casing, a water actuated valve connected to said chamber, a normally closed fuel valve operated by said water valve and adapted to supply fuel to said burner, a lever connected to said fuel valve and supported by said casing, a lever adapted to engage with said first named lever and supported by said casing, and a non-expanding rod engaging with said last named lever for regulating the admission of fuel to said burner to correspond to the variations of temperature in said casing.

In testimony whereof, I, the said JOHN P REINECKE, have hereunto set my hand.

JOHN P. REINECKE.

Witnesses:
O. L. THOMPSON,
T. B. HUMPHRIES.